United States Patent [19]

DeLuca

[11] Patent Number: 4,755,816
[45] Date of Patent: Jul. 5, 1988

[54] BATTERY SAVING METHOD FOR A SELECTIVE CALL RADIO PAGING RECEIVER

[75] Inventor: Michael J. DeLuca, Boca Raton, Fla.

[73] Assignee: Motorola Inc., Schaumburg, Ill.

[21] Appl. No.: 924,375

[22] Filed: Oct. 29, 1986

[51] Int. Cl.$^4$ .................. H04Q 7/00; G08B 27/00
[52] U.S. Cl. ..................... 340/825.44; 340/311.1; 340/636; 455/38; 455/343
[58] Field of Search .............. 340/825.44, 825.47, 340/825.48, 311.1, 636, 635, 660, 661, 663, 691, 384 E; 455/343, 31, 228, 38; 320/48

[56] References Cited

U.S. PATENT DOCUMENTS

| | | | |
|---|---|---|---|
| 3,800,207 | 3/1974 | Kott | 340/635 |
| 4,075,699 | 2/1978 | Schneider et al. | |
| 4,160,240 | 7/1979 | Partipilo | 340/311.1 |
| 4,237,448 | 12/1980 | Weinberg | 340/825.44 |
| 4,412,217 | 10/1983 | Willard et al. | 340/825.44 |
| 4,438,433 | 3/1984 | Smeot et al. | 340/825.44 |
| 4,488,115 | 12/1984 | Podhrasky | 340/636 |
| 4,509,201 | 4/1985 | Sekigawa et al. | 340/636 |
| 4,644,350 | 2/1987 | Ishii | 340/825.44 |
| 4,660,027 | 4/1987 | Davis | 340/636 |

FOREIGN PATENT DOCUMENTS 56-28533 3/1981 Japan ........................ 340/825.44

Primary Examiner—John W. Caldwell, Sr.
Assistant Examiner—Edwin C. Holloway, III
Attorney, Agent, or Firm—Martin J. McKinley

[57] ABSTRACT

In a battery powered radio paging receiver, a battery saving method extends battery life and prevents the loss of messages stored in volatile random access memory. Upon receipt of a message, a plurality of alerting devices (vibrators, LCD back-lights, LED's and audio alert tone generators) are sequentially activated. Before each device is activated, however, the battery voltage is checked to determine if sufficient charge remains to power the alerting device without dropping the battery voltage below the minimum requirement for retaining information in the memory. If an alerting device is activated, the battery voltage is repeatedly checked and if it drops below a threshold level, the device is deactivated. If the alerting device is an escalating volume audio alert tone generator and the battery voltage is below a threshold voltage, the volume of the generator is restricted to its lower volume range. The received message is also checked to determine if it has a priority status. If the message is a priority message, all alerting devices are activated, regardless of the battery voltage.

6 Claims, 6 Drawing Sheets

BATTERY SAVING METHOD FOR A SELECTIVE CALL RADIO PAGING RECEIVER

BACKGROUND OF THE INVENTION

This invention relates to the field of battery charge conservation and more particularly to conserving battery charge during the alert cycle of a selective call radio paging receiver.

Selective call radio paging receivers (commonly called "pagers") have traditionally alerted the user to an incoming message by soundinq an audible alert tone. Although other alerting devices have been previously available, the recent market trend has been to combine several alerting devices in one pager and to operate them concurrently. Such alerting devices include vibrators, automatic back-lighting for liquid crystal displays (LCD's), light emitting diodes (LED's), and alert tone generators with either escalating volume or traditional manual volume adjustment.

One problem with such alerting devices is that they consume large amounts of battery charge during their brief period of activation. Thus, combining several alerting devices in one pager and operating these devices concurrently can rapidly deplete a battery.

A particularly troublesome problem, however, occurs in memory display pagers. Memory display pagers can store a plurality of received messages in the pager's random access memory (RAM). This memory typically draws very little current from the battery and messages can be stored there for many hours, even though the battery may be near depletion. But, random access memories are volatile and the messages stored in the memory can be lost if the battery voltage drops below the minimum voltage necessary for information retention.

Ordinarily, the battery is capable of supplying the voltage and current necessary to operate all the circuits in the pager, including multiple alert devices. As the battery nears depletion, however, its voltage drops and its internal resistance increases. Thus, if several alerting devices are concurrently activated, a large load is placed on the battery and its voltage drops below the minimum voltage required for information retention and the stored messages are lost.

If this failure mode, which is sometimes referred to as catastrophic failure, could be prevented, the battery could operate the non-alerting circuits in the pager for several additional hours, even though the battery is near depletion. Thus, previously received messages would still be retained in the memory and new messages could be received during this extended time period.

SUMMARY OF THE INVENTION

Briefly, the invention is a battery saving method, for use in a battery powered selective call radio receiver that includes an escalating alert device having low and high power operating modes. The method has a plurality of steps including waiting for a message to be received by the selective call radio receiver before proceeding. In additional steps, the lower power mode of the escalating alert device is activated and battery voltage is determined a predetermined time after the low power mode is activated. The high power mode of the escalating alert device is activated if the battery voltage is above a predetermined threshold voltage, otherwise, the escalating alert device remains in the low power mode.

In another embodiment, the battery saving method is for use in a battery powered selective call radio receiver having an alerting device. The method has a plurality of steps including waiting for a message to be received by the selective call radio receiver before proceeding. In additional steps, a first battery voltage sample is obtained and the alerting device is activated if the first battery voltage sample is above a predetermined threshold, otherwise, the alerting device remains deactivated. Then, a second battery voltage sample is obtained if the alerting device is activated. The alerting device is deactivated if the second battery voltage sample is below the predetermined threshold voltage.

In still another embodiment, the battery saving method is for use in a battery powered selective call radio receiver that includes a single power alert device and an escalating alert device having low and high power operating modes. The method has a plurality of steps that includes waiting for a message to be received by the selective call radio receiver before proceeding. In additional steps, a first battery voltage sample is obtained and the single power alert device is activated if the first battery voltage sample is above a first predetermined threshold voltage, otherwise, the single power alert device remains deactivated. The low power mode of the escalating alert device is then activated. A second battery voltage sample is then obtained if the single power alert device is activated. If the second battery voltage sample is below a second predetermined threshold voltage the single power alert device is deactivated. A third battery voltage sample is then obtained a predetermined time after the low power mode is activated. If the third battery voltage sample is above a third predetermined threshold voltage, the high power mode of the escalating alert device is activated, otherwise, the escalating alert device remains in the low power mode.

DESCRIPTION OF THE PREFERRED EMBODIMENT

Figure 1:
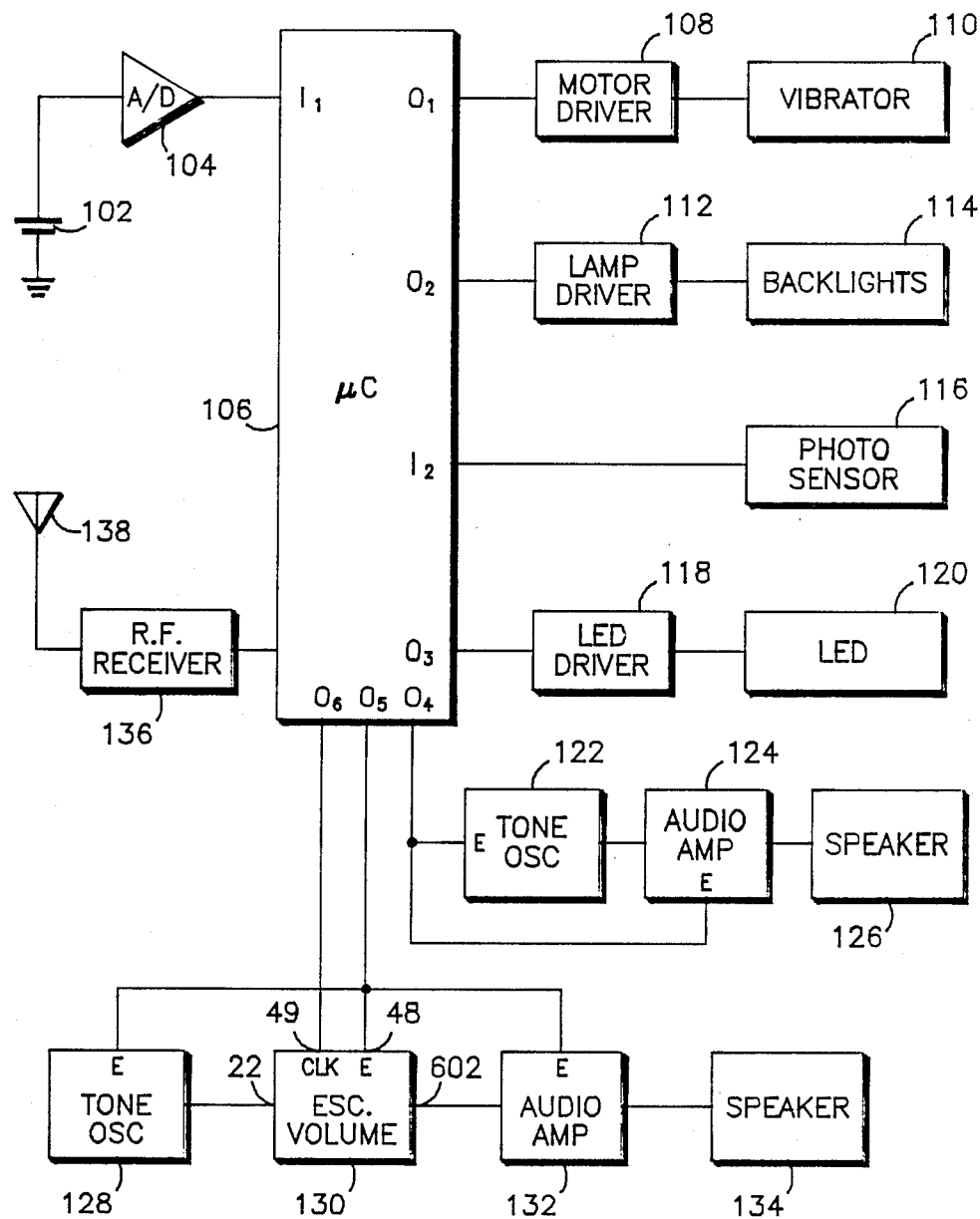
FIG. 1 is a block diagram of a selective call radio paging receiver that incorporates the present invention.

A block diagram of a selective call radio paging receiver is illustrated in FIG. 1. Referring to this figure, a battery 102, preferably a single cell rechargeable Nickel Cadmium battery, is the sole source of power in the paging receiver and its negative terminal is connected to ground. The input of an analog to digital (A/D) converter 104 is connected to the positive terminal of battery 102. Although A/D converter 104 may be a one bit converter, i.e., a simple voltage comparator, a multi-bit A/D converter is preferred. Input $I_1$ of a microcomputer 104, preferably a low power CMOS microcomputer, is connected to the output of A/D converter 104.

A motor driver circuit 108 is connected between output $O_1$ of microcomputer 106 and a vibrator 110. Vibrator 110 is well known in the paging receiver art and typically consists of a conventional rotating electric motor with an eccentric weight connected to the motor's shaft. A lamp driver circuit 112 is connected between output $O_2$ of microcomputer 106 and backlights 114. Backlights 114 are positioned behind a liquid crystal display (not illustrated) and are preferably incandescent lamps of the type known as "grain of wheat". Backlights 114 provide supplemental lighting for the display in the event that ambient light conditions are insufficient to illuminate the message being displayed. The output of a photosensor 116 is connected to input $I_2$ of microcomputer 106. Photosensor 116 is exposed to the ambient light through an opening in the paging receiver's housing and outputs a logic 1 to the microcomputer if the ambient light conditions are above a predetermined intensity level. Under strong ambient light conditions, the output of photosensor 116 can be used to inhibit the activation of backlights 114 to conserve battery charge. An LED driver circuit is connected between output $O_3$ of microcomputer 106 and an LED 120. LED 120 is typically mounted on the top exterior of the paging receiver's housing. The motor, lamp and LED driver circuits 108, 112 and 118, and photosensor circuit 116 are well known in the art.

The enable input of a tone oscillator 122 and audio amplifier 124 are connected to output $O_4$ of microcomputer 106. The signal input of audio amplifier 124 is connected to the output of tone oscillator 122, while the output of the audio amplifier is connected to speaker 126. When the enable inputs are activated, oscillator 122 generates a tone which is audible in speaker 12 after being amplified by audio amplifier 124. Oscillator 122, amplifier 124 and speaker 126 are well known in the art.

In the alternative, a similar tone oscillator 128, audio amplifier 132 and speaker 134 may be used with an escalating volume circuit 130 connected between the output of the oscillator and the signal input of the amplifier. The enabling input 48 of escalating volume circuit 130, and the enabling inputs of tone oscillator 142 and audio amplifier 132 are connected to output 05 of microcomputer 106. The clock input 49 of escalating volume circuit 130 is connected to output 06 of microcomputer 106. The output of audio amplifier 132 is connected to speaker 134.

Figure 4:
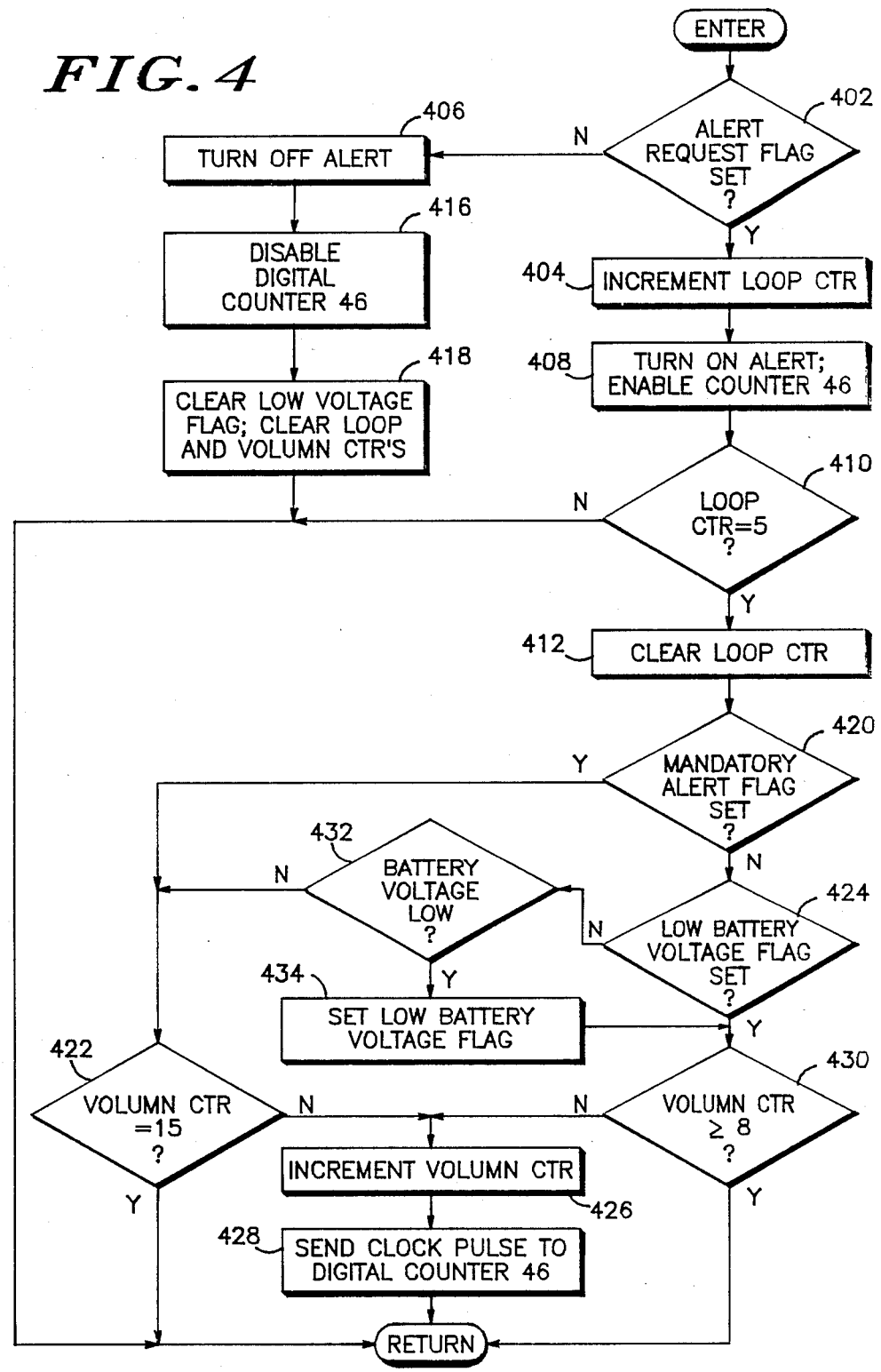
FIG. 4 is a flow chart of the Escalating Volume Alert Subroutine that is accessed from the Background Routine of FIG. 2.

Escalating volume circuit 130 has been previously described in U.S. Pat. No. 4,237,448 to Weinberg and is wholly incorporated by reference herein. In the preferred embodiment, escalating volume circuit 130 is as illustrated in FIG. 4 and described in the specification of the incorporated reference. For convenience, the schematic diagram of the circuit described in the patent has been duplicated herein as FIG. 6. Although a detailed description of the operation of the escalating volume alert circuit is provided in the reference, a brief explanation of its operation is described in the following paragraph.

Figure 6:
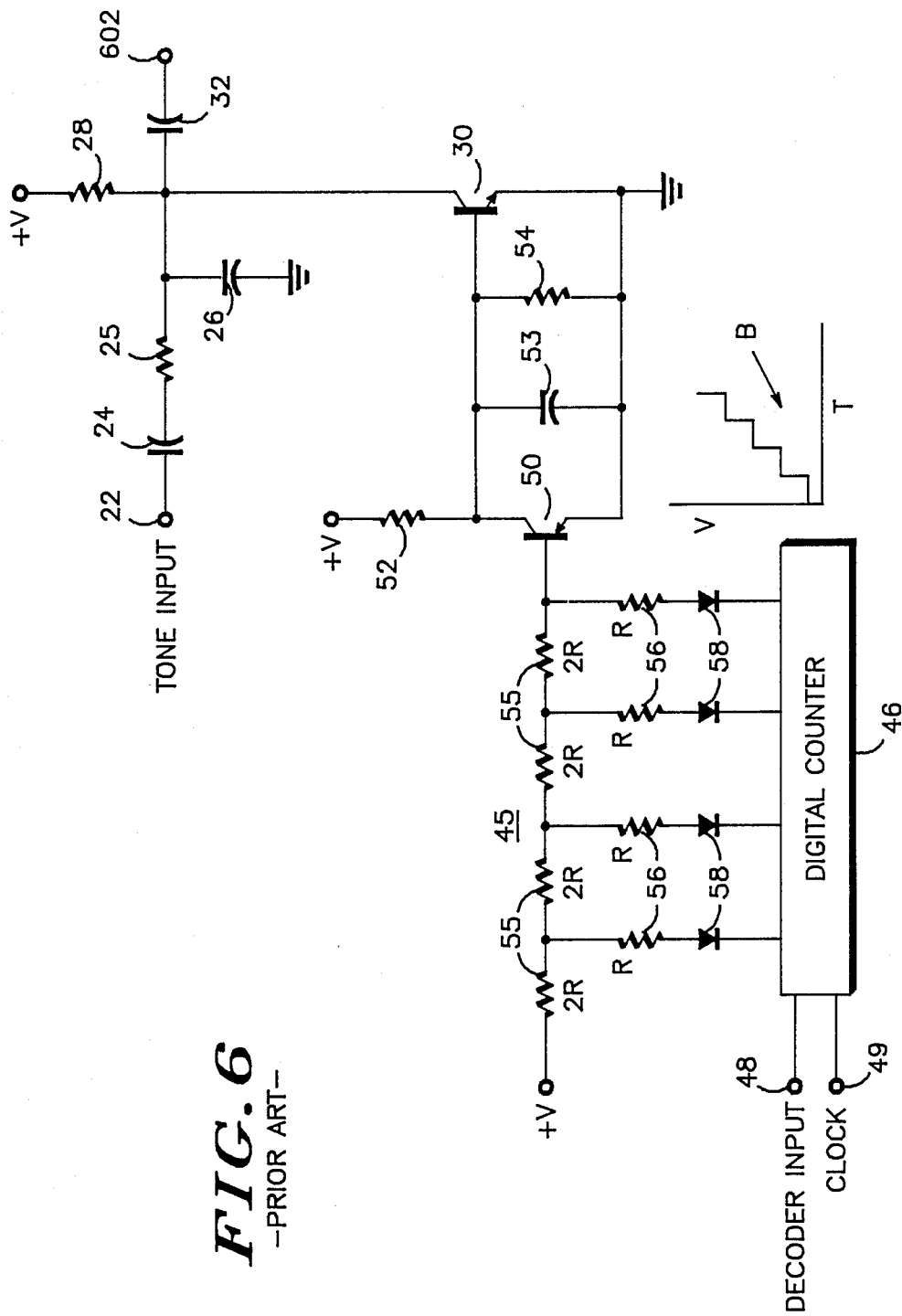
FIG. 6 is a schematic diagram of the escalating volume alert device illustrated in U.S. Pat. No. 4,237,448, which is wholly incorporated by reference herein.

Referring to FIG. 6, resistor 25 and transistor 30 form a voltage divider circuit that selectively attenuates the amplitude of the tone applied to node 22 as a function of the conduction of transistor 30. A "2R-R" (55,56) resistive ladder network indirectly varies the bias current to transistor 30 by selectively grounding one or more of the "R" resistors (56) in the ladder. The "R" resistors are selectively grounded when a logic zero appears at the corresponding output of four bit binary counter 45. When counter 45 is initially enabled by activating node 48, the counter is cleared. When the counter is clocked at node 49, its output states change, thereby selectively grounding various combinations of "R" resistors. This changes the conduction of transistor 30 by changing its bias current, which in turn varies the attenuation of the tone. This attenuated tone appears at output node 602.

Returning to FIG. 1, a radio frequency receiver 136 is connected between antenna 138 and microcomputer 106. R.F. receiver block 136 includes well known circuits suitable for receiving and demodulating a message transmission, and for delivering a digital signal to microcomputer 106. The paging receiver of FIG. 1 obviously includes other circuits (not illustrated) which are well known in the paging receiver art and which are required for the proper operation of the paging receiver. One example of such a circuit is a voltage multiplier which is necessary to power circuits which require more voltage than battery 102 can provide.

FIGS. 2-5 are flowcharts that describe the operation of the present invention. The actual microcomputer code will obviously depend on the particular type of microcomputer 106 selected. Those skilled in the art will understand how to generate this code.

Figure 2:
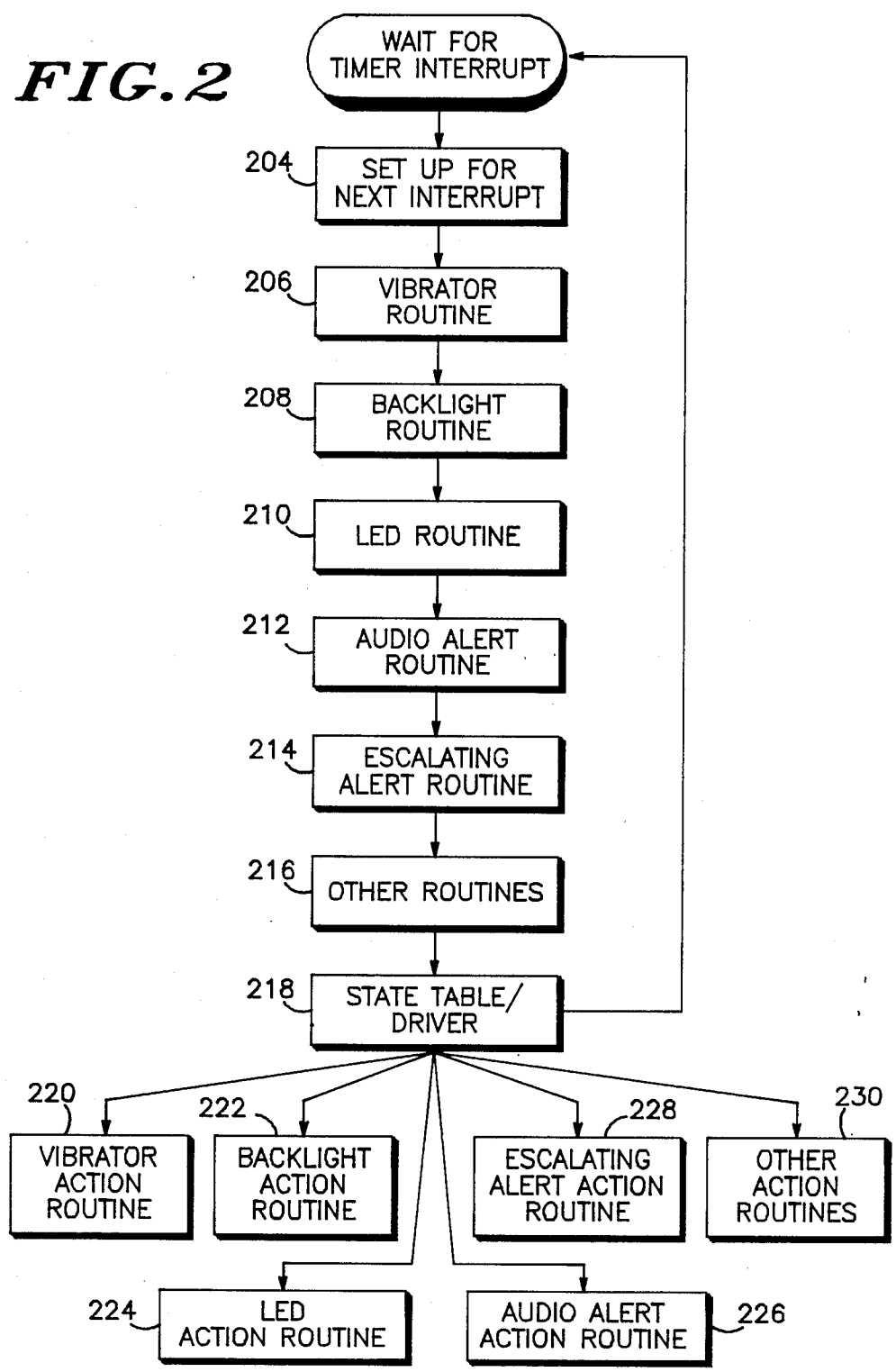
FIG. 2 is a flow chart of the Background Routine of the present invention.

In FIG. 2, a flowchart of the Background Routine of the present invention is illustrated. Referring to this figure, when a timer internal to microcomputer 106 counts down to zero, the Foreground Routine (not illustrated) is interrupted and the program vectors to the first step 204 of the Background Routine. Typically, these timer interrupts occur every 77.5 milli-seconds and the internal timer is reinitialized in step 204 such that an additional interrupt will occur in another 77.5 milli-seconds.

Next, a Vibrator Routine 206, a Backlight Routine 208, an LED Routine 210 and an Audio Alert Routine 212 are executed sequentially. These four routines are generically illustrated in the flowchart of FIG. 3 and described in detail later. In the following step 214, the Escalating Alert Routine, which is illustrated in detail in FIG. 4, is executed. In next step 216, any other routine that needs to be performed every 77.5 milli-seconds is then executed.

Figure 5:
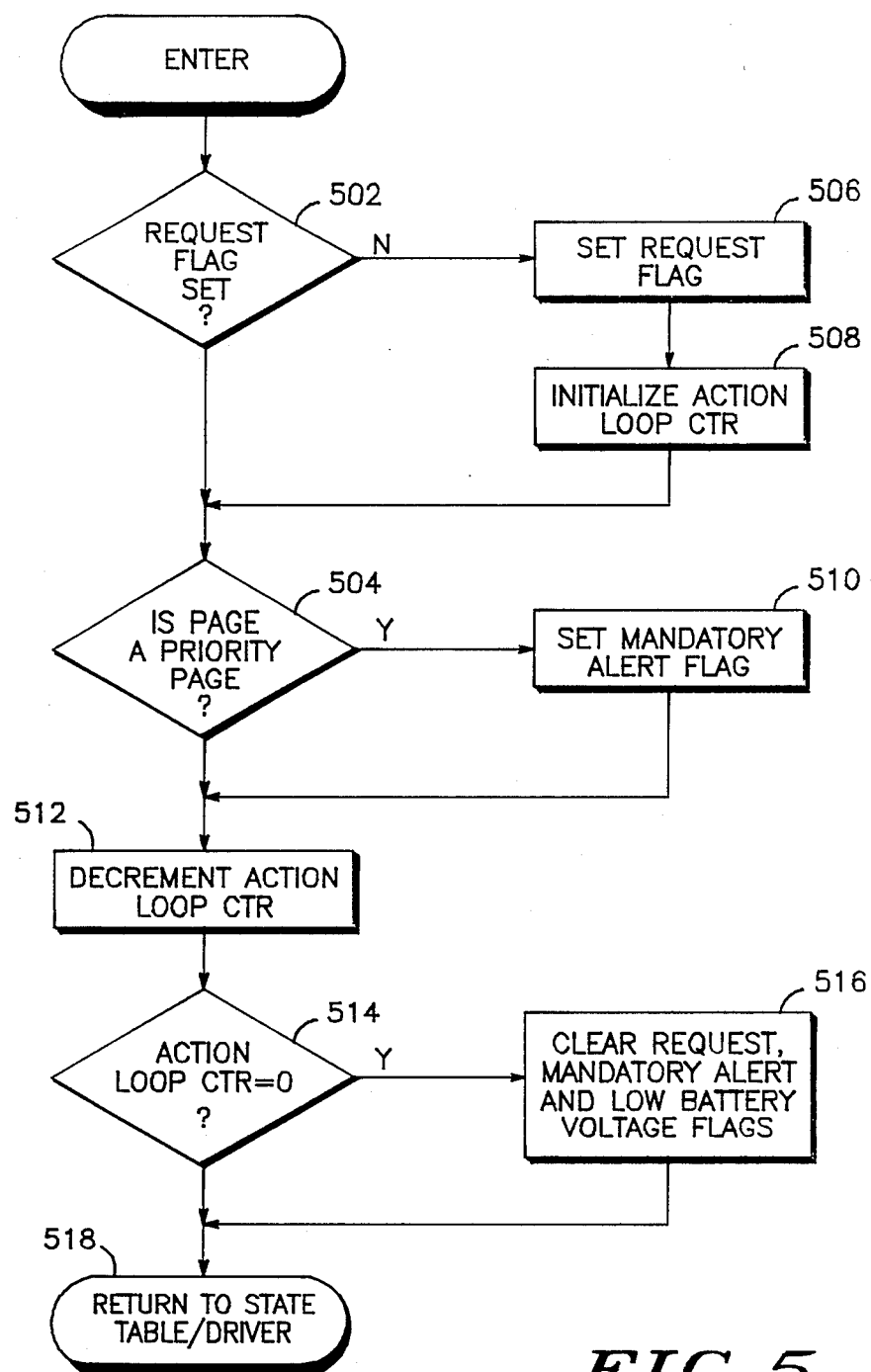
FIG. 5 is a flow chart of a typical Action Routine that is accessed by the State Table/Driver of FIG. 2.

In the following step 218, a well known State Table/Driver picks up vectors from the Foreground Routine and other routines 216 and appropriately directs the Background Routine to Vibrator Action Routine 220, Backlight Action Routine 222, LED Action Routine 224, Audio Alert Action Routine 226, Escalating Alert Action Routine 228 and other action routines 230. Upon executing all the selected action routines, the program then returns from State Table/Driver 218 to the Foreground Routine and waits for another timer interrupt. A flowchart of a typical action routine is illustrated in FIG. 5 and described in detail later.

Figure 3:
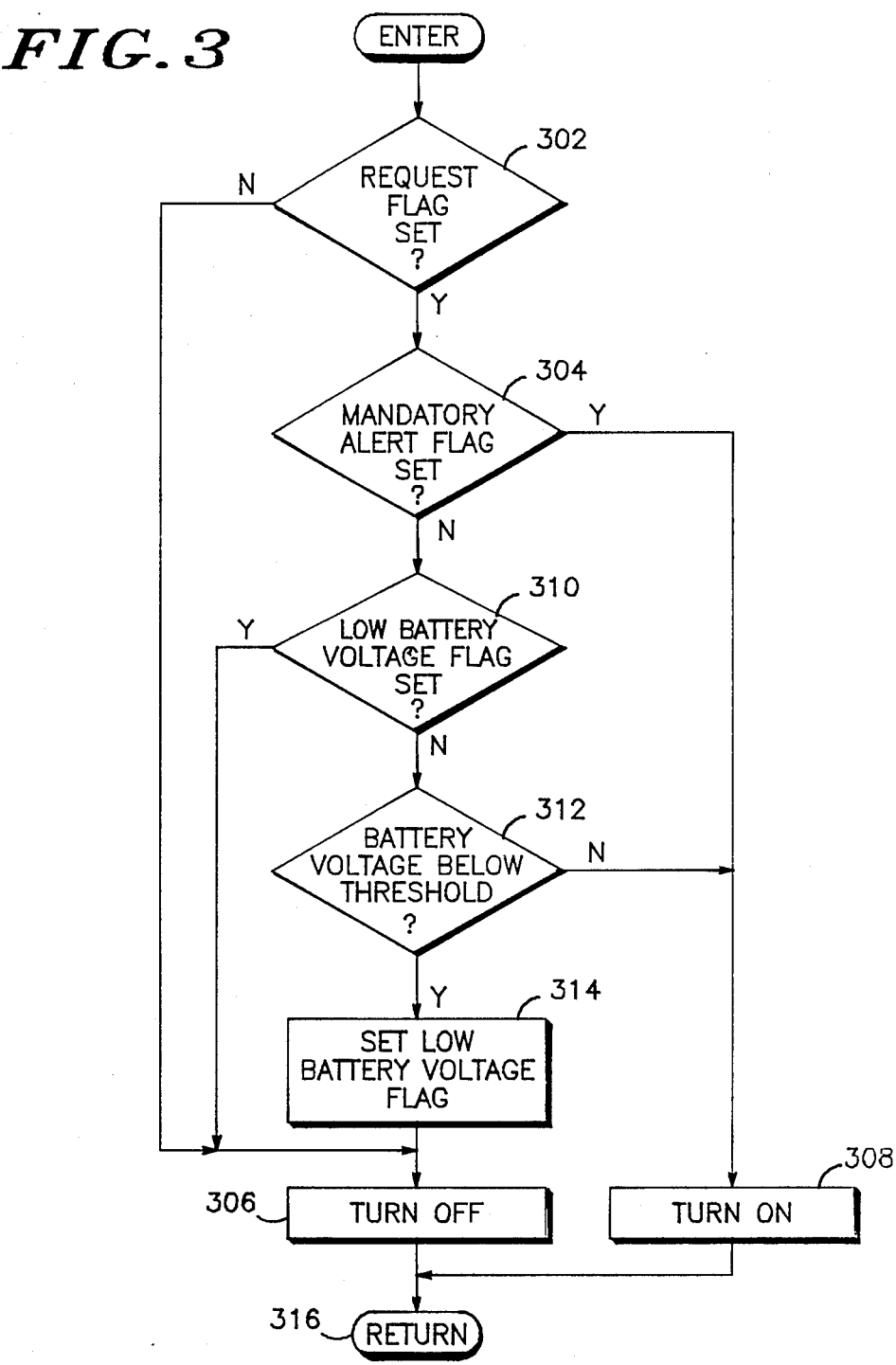
FIG. 3 is a flow chart of a typical Vibrator, Backlight, LED or Audio Alert Subroutine that is accessed from the Background Routine of FIG. 2.

In FIG. 3, a generic flowchart of the Vibrator 206, Backlight 208, LED 210 or Audio Alert 212 Routine is illustrated. In step 302, if the particular request flag has been set, the program branches to step 304; otherwise, it branches to step 306 where the particular alerting device is deactivated. Request flags are unique to a particular alerting device, i.e., there is a vibrator request flag, a backlight request flag, etc. These request flags are set or cleared by the corresponding action routine. In step 304, if the mandatory alert flag is set the program branches to step 308 and the alerting device is activated;

otherwise, the program branches to step 310. In step 310, if a low battery voltage flag is set the program branches to step 306 and the alerting device is deactivated; otherwise, the program branches to step 312. In step 312, the battery voltage is sampled by A/D converter 104 and if the sample voltage is below a predetermined threshold voltage, the program branches to step 314 wherein the low battery voltage flag is set; otherwise, the program branches to step 308 and the alerting device is activated. Following step 314, step 308 is executed and the particular alerting device is turned off. In step 316, the program then proceeds to the next routine.

FIG. 3 generically illustrates the operation of an alerting routine for the "single power" alerting devices such as the vibrator, backlight, LED and the non-escalating volume audio alert circuit. These devices are referred to as "single power" because they are either "on" or "off", and no means is provided to electronically alter their output power. Note that the non-escalating volume audio alert circuit is included in this category even though its output volume may be manually adjusted by the user.

When an alerting routine is executed, assuming that its request flag has been sent, the routine will automatically turn on the alerting device if the mandatory alert flag is set. As will be described in detail later in conjunction with the action routines, the state of the mandatory alert flag is previously set or cleared in the action routine. The action routine examines the priority status of the received message and sets the mandatory alert flag if the message is a priority message. Thus, all alerting devices will be activated, even if the battery voltage is low, if the message is a priority message and the mandatory alert flag has been set.

If the mandatory alert flag has not been set, the battery voltage is sampled the first time the routine is executed (i.e., the first time after the request flag is set). If the battery voltage sample is above a predetermined threshold voltage, the alerting device is activated. If the battery voltage sample is below this threshold voltage, the low battery voltage flag is set and the alerting device remains deactivated. The low battery voltage flag provides hysteresis in the program and ensures that once the flag is set, the alerting device remains off throughout the entire alerting period (typically 6 or 7 seconds). A predetermined time later (typically 77.5 milli-seconds) the alerting routine is executed again and, if the alerting device is activated, a second battery voltage sample is obtained. If the second battery voltage sample is below the predetermined threshold voltage, the low battery voltage flag is set and the device is deactivated. This periodic sampling of the battery voltage is repeated as long as the alerting device remains active.

In FIG. 4, the alerting routine for an escalating volume alerting device is illustrated. Referring to this figure, in step 402 the program branches to step 404 if the escalating alert request flag is set; otherwise, the program branches to step 406 wherein the escalating alert device is turned "off" (or remains "off"). In step 404, a loop counter is incremented and in the following step 408, the escalating alerting device is activated. In the next step 410, if the loop counter is equal to 5, the program branches to step 412 wherein the loop counter is cleared; otherwise the program jumps to the next routine (step 414). Following step 406, wherein the escalating alerting device is deactivated, the program proceeds to steps 416 wherein digital counter 46 (see FIG. 6) is disabled. In the following step 418, the low voltage flag, and the loop and volume counters are cleared. The program then jumps to the next routine (step 414).

In step 420, which follows step 412, the program branches to step 422 if the mandatory alert flag is set; otherwise, the program branches to step 424. In step 422, if the volume counter is equal to 15, the program jumps to the next routine (step 414); otherwise step 426 is executed. In step 426, the volume counter is incremented and in the following step 428, a clock pulse is sent to digital counter 46 (FIG. 6). After step 428, the program jumps to the next routine (step 414). Returning to step 424, if the low battery voltage flag is set, the program branches to step 430; otherwise to step 432. In step 430, if the volume counter is greater than or equal to 8, the program jumps to the next routine (step 414); otherwise, step 426 is executed. Returning to step 432, if the battery voltage is sampled and the sample voltage is below a predetermined threshold voltage, a low battery voltage flag is set in step 434 and the routine proceeds to step 430; otherwise, step 422 is executed.

The escalating alert routine of FIG. 4, and the escalating alert device illustrated in FIG. 6 provide for 16 distinct volume steps. When the routine is first executed, assuming the alert request flag is set, the escalating alert device is initially activated in its lowest volume state. Every five times through the loop the volume of the escalating alert circuit is incremented by one step. After incrementing the volume, the battery voltage is sampled to determine whether it is above or below a predetermined threshold voltage. If it is below the predetermined threshold voltage level, a flag is set and the escalating alert circuit is prevented from being incremented above the 8th volume level (or, if it is already above the 8th volume level, no further increments will take place). If the battery voltage sample is above the predetermined threshold level, every time step 432 is executed the volume counter will be incremented until it hits 15, whereupon the highest volume output of the circuit occurs.

Although 16 volume levels have been described in the preferred embodiment, it should be evident to those skilled in the art that the circuit of FIG. 6 and the flow chart of FIG. 4 could be adopted to operate with any number of volume levels desired. In its simplest form, the escalating alert circuit and routine would have two power or volume modes, "low" and "high". Thus, the routine of FIG. 4 would begin by activating the low volume mode of the escalating alert device. Next, the battery voltage would be sampled at a predetermined time after the low power mode is activated. The high volume mode would be activated if the battery voltage sample was above a predetermined threshold voltage. Otherwise, the escalating alert device would remain in the low volume mode. As in the other alert routines, the low voltage flag provides hysteresis such that the escalating alert device will remain in its low volume mode throughout the alerting period once it is set.

A generic action routine is illustrated in FIG. 5. Referring to this figure, in step 502 the action routine branches to step 504 if the request flag is set; otherwise, steps 506 and 508 are executed wherein the request flag is set and the action loop counter is initialized. In the following step 504, the action routine analyses the incoming coded message to determine if it is a priority page. A particular bit in the message is usually reserved to indicate the priority status of the message. Thus, step 504 merely has to examine the status bit to determine the priority of the message. If the message is a priority page, the mandatory alert flag is set in step 510; otherwise the program proceeds to step 512. In step 512, the action loop counter is decremented. In the following step 514, if the action loop counter is equal to zero, the action routine branches to 516 where the request, mandatory alert, and low battery voltage flags are cleared; otherwise, the program jumps to the State Table/Driver (step 518).

In summary, each action routine sets the corresponding request flag which will be acted upon when the respective device alert routine is executed. The action routine also analyses the incoming data message to determine whether it has a priority status. If the message has a priority status, the mandatory alert flag is set and the alert device is activated when the alert routine is executed, even though the battery voltage is below a predetermined threshold voltage. When the action loop counter has been decremented to zero the request, mandatory alert, and low battery voltage flags are cleared. When the message is first received, if the action loop counter is initialized to a value of approximately 80, the corresponding alert device will be activated for an "alert period" of approximately 6.2 seconds (80×77.5 milliseconds=6.2 seconds).

Obviously, not every pager will be equipped with all five types of alerting devices described herein. If the pager is equipped with two alerting devices, for example a vibrator and an escalating volume alert generator having low and high volume modes, the battery saving method would proceed as follows: after the message is received, a first battery voltage sample would be obtained. The vibrator would then be activated if the first battery voltage sample was above a predetermined threshold voltage. Otherwise, the vibrator would remain deactivated. Next, the low volume mode of the escalating alert device would be activated. If the vibrator where previously activated, a second battery voltage sample would then be taken. If the second battery voltage sample were below a predetermined threshold voltage, the vibrator would be deactivated. Next, a third battery voltage sample would be obtained at a predetermined time after the low volume mode of the escalating device was activated. If the third battery voltage sample was above a predetermined threshold voltage, the high volume mode of the escalating alert device would be activated; otherwise the escalating alert device would remain in its low volume mode.

I claim:

1. A battery saving method, for use in a battery powered selective call radio receiver including an escalating alert device having low and high volume modes, comprising the steps of:
   waiting for a message to be received by said selective call radio receiver, then proceeding when a message is received;
   activating said low volume mode of said escalating alert device;
   determining the battery voltage a predetermined time after said low volume mode is activated;
   activating said high volume mode of said escalating alert device if the battery voltage is above a predetermined threshold voltage, otherwise, said escalating alert device remains in said low volume mode.

2. The battery saving method of claim 1, further comprising the steps of:
   determining the priority status of the received message; and
   activating said high volume mode at said predetermined time after said low volume mode is activated if said message is priority message, regardless of the battery voltage.

3. A battery saving method, for use in a battery powered selective call radio receiver having an alerting device, comprising the steps of:
   waiting for a message to be received by said selective call radio receiver, then proceeding when a message is received;
   obtaining a first battery voltage sample
   activating said alerting device if the first battery voltage sample is above a predetermined threshold voltage, otherwise, said alerting device remains deactivated;
   obtaining a second battery voltage sample if said alerting device is activated; and
   deactivating said alerting device if the second battery voltage sample is below a predetermined threshold voltage.

4. The battery saving method of claim 3, further comprising the steps of:
   determining the priority status of the received message; and
   activating said alerting device after receiving the message, regardless of the battery voltage, if the message is a priority message.

5. A battery saving method, for use in a battery powered selective call radio receiver including a single power alert device and an escalating alert device having low and high volume modes, comprising the steps of:
   waiting for a message to be recieved by said selective call radio receiver, then proceeding when a message is received;
   obtaining a first battery voltage sample;
   activating said single power alert device if the first battery voltage sample is above a first predetermined threshold voltage, otherwise, said single power alert device remains deactivated;
   activating said low volume mode of said escalating alert device;
   obtaining a second battery voltage sample if said single power alert device is activated;
   deactivating said single power alert device if the second battery voltage sample is below a second predetermined threshold voltage;
   obtaining a third battery voltage sample a predetermined time after said low volume mode is activated; and
   activating said high volume mode of said escalating alert device if the third battery voltage sample is above a third predetermined threshold voltage, otherwise, said escalating alert device remains in said low volume mode.

6. The battery saving method of claim 5, further comprising the steps of:
   determining the priority status of the received message; and
   activating said single power alert device after receiving the message, regardless of said first battery voltage sample, if the message is a priority message; and
   activating said high volume mode at said predetermined time after said low volume mode is activated, regardless of said third battery voltage sample, if said message is a priority message.

* * * * *